United States Patent [19]

Chittineni

[11] Patent Number: 4,964,088
[45] Date of Patent: Oct. 16, 1990

[54] METHOD FOR TOMOGRAPHICALLY LATERALLY VARYING SEISMIC DATA VELOCITY ESTIMATION

[75] Inventor: Chittibabu Chittineni, Newark, Del.
[73] Assignee: Conoco Inc., Ponca City, Okla.
[21] Appl. No.: 430,704
[22] Filed: Oct. 31, 1989
[51] Int. Cl.[5] ............................................... G01V 1/28
[52] U.S. Cl. ....................................... 367/51; 367/56; 364/421
[58] Field of Search ...................... 367/36, 38, 59, 73, 367/51, 50, 54, 56; 364/421

[56] References Cited

U.S. PATENT DOCUMENTS

| | | | |
|---|---|---|---|
| 4,214,226 | 7/1980 | Narasimhan et al. | 367/27 |
| 4,415,999 | 11/1983 | Moeckel et al. | 367/73 |
| 4,679,174 | 7/1987 | Gelfand | 367/73 |
| 4,839,869 | 6/1989 | Corcoran | 367/53 |

Primary Examiner—Ian J. Lobo

[57] ABSTRACT

A process for tomographic development of seismic section data having known source and receiver positions. The process employs forward modeling to estimate travel times of the rays through the earth medium. The medium is assigned a cellular constitution and ray tracking proceeds through individual cell analysis within a two dimensional neighborhood to join a series of individual cell velocity values, e.g. the velocity values at the cell corners. Ray tracing proceeds utilizing derived expressions for position, orientation, and travel time of the ray in the cell as a function of cell dimensions, initial ray position, ray orientation, and the neighborhood velocity values. A travel time equation is then derived and used to construct a model parameter estimation and finalized estimated data output.

18 Claims, 7 Drawing Sheets

METHOD FOR TOMOGRAPHICALLY LATERALLY VARYING SEISMIC DATA VELOCITY ESTIMATION

BACKGROUND OF THE INVENTION

1. Field of the Invention.

The present invention relates to the processing of seismic data utilizing a tomographic process and, more particularly, but not by way of limitation, it relates to an improved method for velocity estimation of seismic data using the seismic tomography processing.

2. Brief Description of the Prior Art.

The prior art processes for ray-tracing evaluated the subsurface in terms of determinative cells of constant slowness values which were then reconstructed to approximate seismic ray paths, still other types employed finite difference ray-tracing methods. The prior types using constant slowness values for analyzing individual cell structures culminated in very severe reconstruction resolution limitations. The alternative finite difference tracing methods introduced uncertainties that make them unsuitable for iterative estimation schemes. None of the prior art types treat the field within a cell as continuous, and an assumption must be made that the cell either is constant in value or constant in the value of its gradient. This approach brings about severe limitation in terms of resolution and continuity of the reconstructed field. The prior art schemes also employ computationally expensive finite-difference ray-tracing schemes that are not always suitable for parameter adjustment algorithms and other attempts to generalize such diverse data.

SUMMARY OF THE INVENTION

In the present method, the seismic section or presentation medium is divided into cells of a preselected size and either slowness or velocity values are specified at the cell corners. Source and receiver positions are known relative to the medium and rays are plotted from the source at specific angular increments from a minimum to a maximum angle with subsequent iterative adjustment of tracing angles, i.e., source-reflector-receiver. The basic elements of the tomographic process for velocity estimation consists of the estimation of travel times of the rays through the medium by forward modeling, plus a following model parameter estimation. Ray tracing derives from individual cell analysis as the parameters of the medium are the velocities at the individual cell corners and the depths of reflector along vertical cell walls. The velocity field in a cell is reconstructed using the velocity values at the cell corners in a local two-dimensional neighborhood and ray-tracing is carried out utilizing derived expressions for position, orientation, and travel time of the ray in the cell as a function of cell dimensions, initial ray position, ray orientation, and the velocity values within a local two-dimensional neighborhood. Linearization is then used to set up a travel-time equation for parameter estimation, and derivations of travel time relative to velocities and reflector position enable construction of the model parameter estimation leading to finalized estimated data readout.

DETAILED DESCRIPTION OF THE INVENTION

Figure 1:
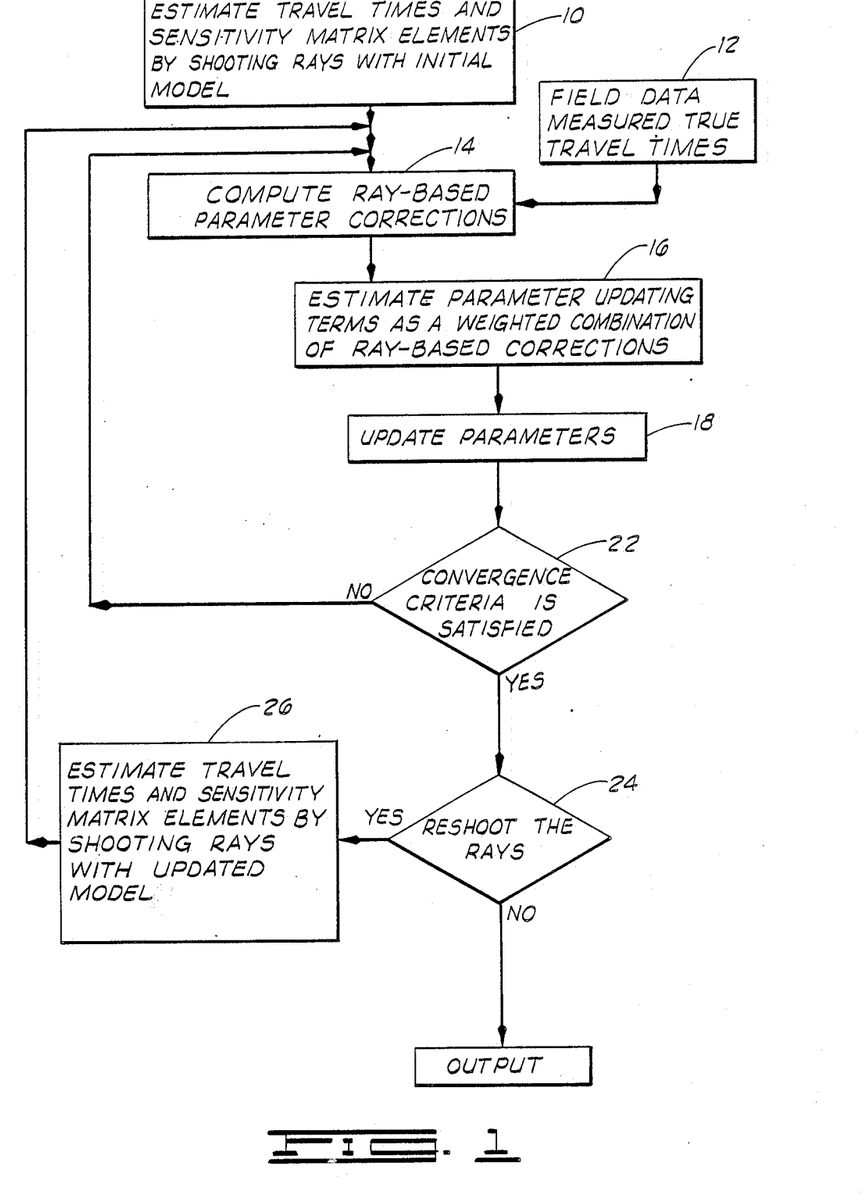
FIG. 1 is a flow diagram of a general tomographic velocity estimation computational flow.

The general computational flow for tomographic velocity estimation is shown in FIG. 1. In relation thereto, reference will be made to the travel time measurements taken for a constant offset section; however, the concepts are equally applicable with configurations of data such as source gathers, common basement point data, etc.

The travel times between a source and receiver for specific reflectors are measured in constant offset sections of prestack data and these constitute the true travel times. Starting with an initial depth model, travel times are estimated by tracing rays, and subsequently the parameters of the model are updated by successively comparing the estimated travel times with the true travel times as will be described. The ray tracing and the parameter adjustment by iteration are continued until certain convergence criterion is satisfied. Thus, flow stage 10 of FIG. 1 inputs estimated travel times and designates sensitivity matrix elements by shooting the source-reflector-receiver rays with the initial model. The true field data travel times are available at flow stage 12 for input with data from flow stage 10 to flow stage 14 which functions to compute the ray-based parameter corrections.

In first parameterizing the depth model, the medium or data section is divided into a predetermined array of cells of certain designated size. The velocity file is parameterized in terms of velocities at the cell corners and reflectors are described in terms of depth of reflectors along vertical cell walls, as will be described. The model parameters then are the velocities of the medium at the cell corners and the depth of reflectors along cell walls.

Figure 2:
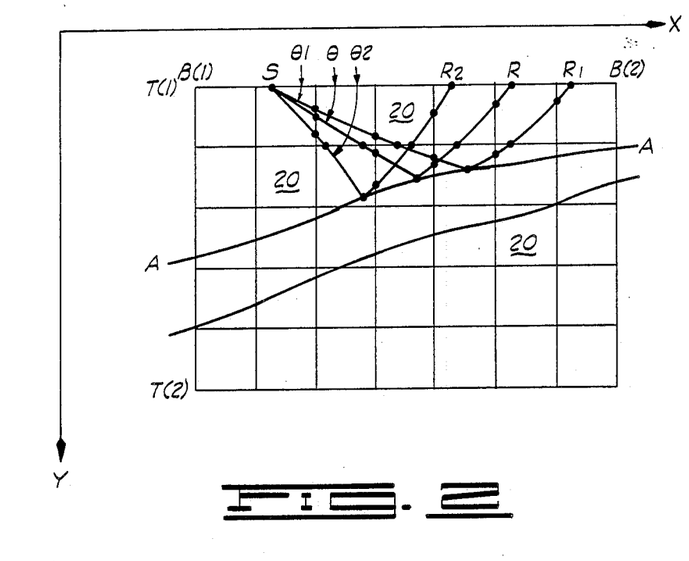
FIG. 2 is a graphic depiction illustrating emanation of seismic rays from a source for different initial shooting angles.

FIG. 2 illustrates in generalized form a global coordinate system wherein the data medium is divided into cells of certain size where B(1), B(2), T(1) and T(2) define the medium expanse relative to the coordinate axes x and y. Thus, to trace a ray between a source position S and a receiver position R for reflector AA, rays are shot from S at different initial angles $\theta$ through $\theta_n$ for interpolated receiver positions R through $R_n$ by iterative establishment. The key computation of ray shooting from a source position at a certain initial angle is the tracing of a ray through a cell which depends upon the presence or absence of a reflector within the particular cell. Knowing the ray position and orientation as the point of entrance to a cell, and presence of a reflector, then enables computation of the ray position and orientation at the point of exit from the cell, as will be further described.

Interval velocities for the initial model are selected based upon available a priori information, e.g., well data or the like, or they may be derived from stacked velocities or by estimating interval velocities using stack optimization. For a particular basement point the equation that relates the interval velocities $VI_j$, the RMS velocities $VR_i$ and zero offset travel times $t_i$ may be given as $$VR_i = \left[ \frac{\sum_{j=1}^{i} (t_j - t_{j-1}) VI_j^2}{t_i} \right]^{\frac{1}{2}} \quad (1)$$

Knowing the RMS velocities VR for the above equation can be inverted to yield the interval velocity VI.

Flow stage 16 (FIG. 1) then commences the operation of parameter adjustment as the stage functions to estimate parameter updating terms as a weighted combination of ray-based corrections as applied to data in flow stage 18. The ray tracing between a specific source S and receiver R for update of the initial model parameters by estimating the travel times and other necessary information is done in a manner as follows. Referring again to FIG. 2, rays are shot from the source S at specific angular increments, starting from a certain minimum angle and proceeding until a certain maximum angle is reached. The angular positions for which the rays and the receivers are obtained by iterative establishment of shooting angles. When the medium is divided into cells 20, the heart of the calculation involves tracing a ray through the cells in a designated manner.

After update of parameters at stage 18, a decision stage 22 performs the designated criteria tests which, if satisfied, passes flow through the final decision stage 24 to output. If criteria is not satisfied in stage 22, then flow recycles to repeat from stage 14 computing ray-based parameter corrections. If complete ray tracing must be repeated as detected in flow stage 24, then stage 26 performs flow stage 10 functions with an updated model for recycling for repetition through stage 14.

Figure 3:
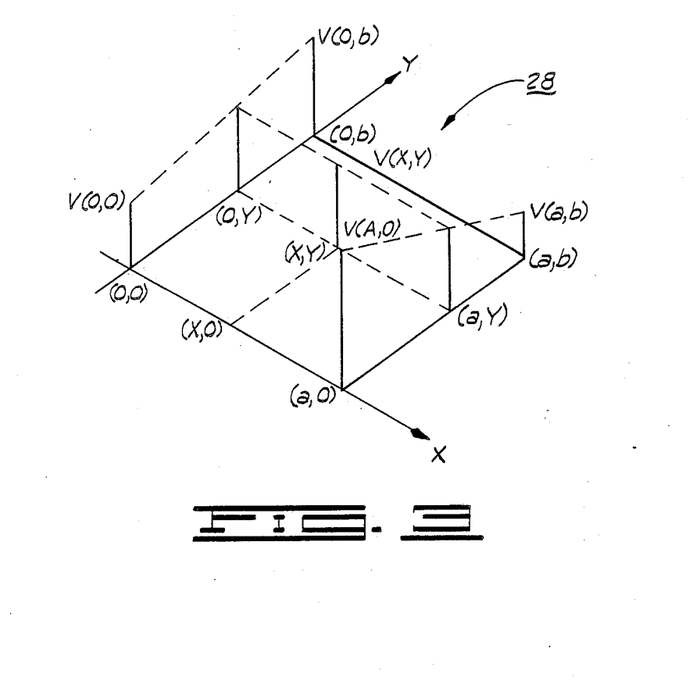
FIG. 3 is a graphic depiction of bilinear interpolation of velocity values in a designated cell interior.

FIG. 3 illustrates the manner in which bilinear interpolation of velocity values is determined within a cell's interior. A coordinate system 28 is assumed to be positioned so that the origin coincides with the bottom lefthand corner of a cell, i.e., the coordinate (0,0). Given the velocity values at the corners of a cell, the bilinearly interpolated velocity value at a point r interior to the cell can be obtained as:

$$V(r) = V_o + H_1 T_r + \frac{1}{2} r^T H_2 r \quad (2)$$

where r equals $(x, y)^T$ is the position vector of a point (x, y) in the cell, $V_o$ is the velocity value at the origin, V(r) is the interpolated velocity value of the point (x, y), and T denotes matrix transposition. Let V(x, y) be the velocity value at the point (x, y), and let a and b denote the dimensions of the cell. The quantities $H_1$ and $H_2$ are then defined as $$H_1 = \nabla_r [V(r)]|_{r=o} = \begin{bmatrix} v_1 \\ v_2 \end{bmatrix} \quad (3)$$

and $$H_2 = \begin{bmatrix} \frac{\partial^2 V}{\partial x^2} & \frac{\partial^2 V}{\partial x \partial y} \\ \frac{\partial^2 V}{\partial x \partial y} & \frac{\partial^2 V}{\partial y^2} \end{bmatrix} = \begin{bmatrix} 0 & v_3 \\ v_3 & 0 \end{bmatrix} \quad (4)$$

where $$v_1 = [V(a,o) - V(o,o)]/a, \quad (5)$$
$$v_2 = [V(o,b) - V(o,o)]/b, \text{ and}$$
$$v_3 = [V(a,b) + V(o,o) - V(a,o) - V(o,b)]/ab.$$

Let $$v_o = V(o,o), \; v_a = V(a,o), \; v_b = V(o,b) \text{ and} \quad (6)$$
$$v_{ab} = V(a,b)$$

One of the important features of the bilinear interpolation is that the interpolated velocity field is continuous across the cell boundaries from cell to cell.

Figure 4:
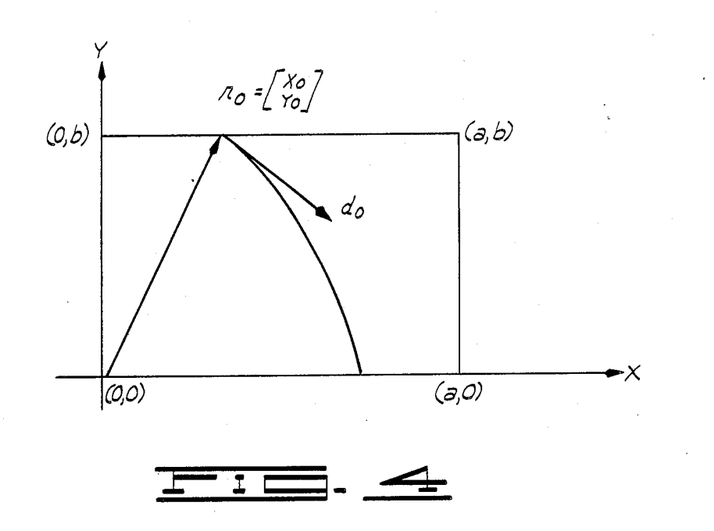
FIG. 4 is a graphic depiction of a ray patch within a cell.

It is next necessary to have a scheme for tracing the rays within the cell when the velocities are specified at the cell corners. Thus, given the position and the orientation of the ray entering the cell, the expressions may be derived for obtaining the position, orientation, and travel time of the ray as a function of path parameter. Referring to FIG. 4, the quantity $r_o$ is the position and $d_o$ is the orientation of the ray entering the cell. The equation which describes the path of a ray in an inhomogeneous medium can be written as $$\frac{d}{ds}\left(\frac{1}{V(r)} \frac{dr}{ds}\right) = \nabla_r\left(\frac{1}{V(r)}\right) \quad (7)$$

where ds is the differential path length along the ray, r is the position vector on the ray, and V(r) is the velocity value at position r. Integration of Equation (7) yields an expression for the position r as a function of path length s and the resulting expression is $$r(s) = r_o + \frac{d_o}{v(r_o)} \int_o^s V(r(s'))ds' + \quad (8)$$

$$\int_o^s V(r(s')) \left[ \int_o^{s'} \nabla_r\left(\frac{1}{V(r(s'))}\right) ds'' \right] ds'$$

Expanding r(s) in Taylor's series around s=o $$r(s) = r_o + d_o s + \frac{1}{2} \left. \frac{d^2 r}{ds^2} \right|_{s=o} s^2 \quad (9)$$

Then from Equation (7) we obtain $$\left. \frac{d^2 r}{ds^2} \right|_{s=o} = V(r_o) \left[ \nabla_r\left(\frac{1}{V_r}\right) - \right. \quad (10)$$

-continued $$\left(\nabla_r\left(\frac{1}{V(r)}\right)\cdot\frac{dr}{ds}\right)\frac{dr}{ds}\right]\bigg|_{s=o}$$

and putting Equation (10) into Equation (9) yields $$r(s) = r_o + d_o s + \frac{s^2}{2} V(r_o)\left[\nabla_r\left(\frac{1}{V(r)}\right) - \right. \tag{11}$$

$$\left.\left(\nabla_r\left(\frac{1}{V(r)}\right)\cdot\frac{dr}{ds}\right)\frac{dr}{ds}\right]\bigg|_{s=o}$$

From Equation (2), after keeping only the terms of first order in $H_1$ and $H_2$, we get $$\nabla_r\left(\frac{1}{V(r)}\right)\bigg|_{\substack{r=r_o \\ (s=o)}} = \frac{1}{V_o}\left[-\frac{H_1}{V_o} - \frac{H_2 r_o}{V_o}\right] \tag{12}$$

$$\nabla_r\left(\frac{1}{V(r)}\right)\cdot\frac{dr}{ds}\bigg|_{s=o} = \frac{1}{V_o}\left[-\frac{H_1^T}{v_o} - \frac{r_o^T H_2 d_o}{V_o}\right] \tag{13}$$

Substitution then of Equation (12) and Equation (13) in Equation (9) yields $$r(s) = r_o + sd_o + \frac{s^2}{2}\left[\frac{H_1^T d_o}{V_o} d_o + \frac{r_o^T H_2 d_o}{V_o} d_o - \right. \tag{14}$$

$$\left.\frac{H_1}{V_o} - \frac{H_2 r_o}{V_o}\right] + \frac{s^3}{6}\left[\frac{d_o^T H_2 d_o}{V_o} d_o - \frac{H_2^T d_o}{V_o}\right]$$

$$d(s) = d_o + s\left(\frac{H_1^T d_o}{V_o} d_o + \frac{r_o^T H_2 d_o}{V_o} d_o - \frac{H_1}{V_o} - \right. \tag{15}$$

$$\left.\frac{H_2 r_o}{V_2}\right) + \frac{s^2}{2}\left(\frac{d_o^T H_2 d_o}{V_o} d_o - \frac{H_2 d_o}{V_o}\right)$$

The travel time in the cell as a function of path parameters is given as $$t(s) = \int_o^s \frac{ds'}{V(r(s'))} \tag{16}$$

Then, from Equations (14) and (16) we get $$t(s) = \frac{s}{V_o} - \frac{s}{V_o}\frac{H_1^T r_o}{V_o} - \frac{s^2}{2V_o}\frac{H_1^T d_o}{V_o} - \tag{17}$$

$$\frac{s}{2V_o}\frac{r_o^T H_2 r_o}{V_o} - \frac{s^2}{2V_o}\frac{r_o^T H_2 d_o}{V_o} - \frac{s^3}{6V_o}\frac{d_o^T H_2 d_o}{V_o}$$

Equation (17) can be written as $$t_s = \frac{c_o V_o + c_a V_a + c_b V_b + c_{ab} V_{ab}}{(e_o V_o + e_a V_a + e_b V_b + e_{ab} V_{ab})^2} \tag{18}$$

where Equation groups 19, 20 and 21 are $$\left.\begin{array}{l} a_o = s \\ a_1 = s\, r_{ox} - \frac{s^2}{2} d_{ox} \\ a_2 = s\, r_{oy} - \frac{s^2}{2} d_{oy} \\ a_3 = s\, r_{ox}r_{oy} - \frac{s^2}{2} r_{ox}d_{oy} - \frac{s^2}{2} r_{oy}d_{ox} - \frac{s^3}{3} d_{ox}d_{oy} \end{array}\right\} \tag{19}$$

$$\left.\begin{array}{l} C_o = a_o - \frac{a_1}{a} - \frac{a_2}{a} + \frac{a_3}{ab} \\ C_a = \frac{a_1}{a} - \frac{a_3}{ab} \\ C_b = \frac{a_2}{b} - \frac{a_3}{ab} \\ C_{ab} = \frac{a_3}{ab} \end{array}\right\} \tag{20}$$

and $$\left.\begin{array}{l} e_o = \left(1 - \frac{r_{ox}}{a}\right)\left(1 - \frac{r_{oy}}{b}\right) \\ e_a = \frac{r_{ox}}{a}\left(1 - \frac{r_{oy}}{b}\right) \\ e_b = \frac{r_{oy}}{b}\left(1 - \frac{r_{ox}}{a}\right) \\ e_{ab} = \frac{r_{ox}}{a} \cdot \frac{r_{oy}}{b} \end{array}\right\} \tag{21}$$

and it then follows that $$r_o = \begin{bmatrix} r_{ox} \\ r_{oy} \end{bmatrix} \tag{22}$$

and $$d_o = \begin{bmatrix} d_{ox} \\ d_{oy} \end{bmatrix} \tag{23}$$

Figure 5:
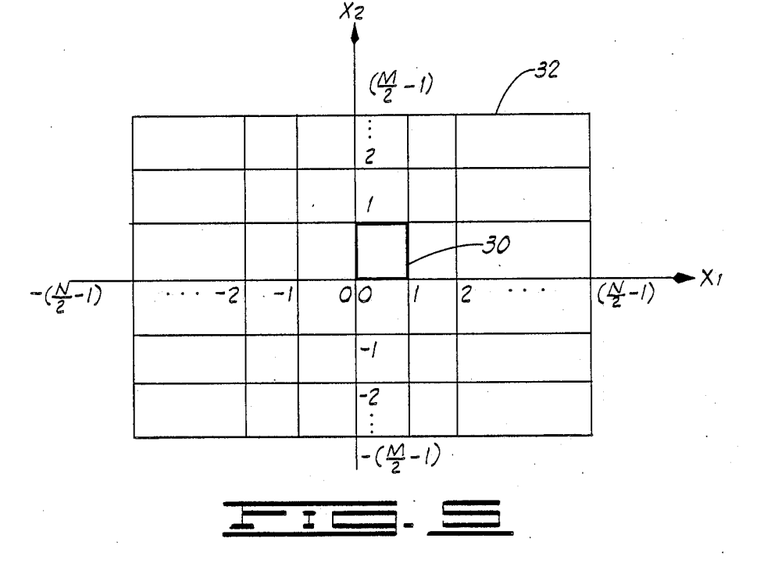
FIG. 5 is a graphic depiction of a local neighborhood of a designated cell.

FIG. 5 illustrates a local neighborhood of a cell in idealized reference form. A cell 30 is under consideration. The tracing of rays within the cell 30 is enabled by local neighborhood reconstruction of the velocity field. A two-dimensional local neighborhood 32 ($\Gamma_o$) of size M×N of the cell 30 is shown as being positioned at a designated place in the coordinate system of FIG. 5. The velocity field at a point in the cell 30 is reconstructed using the velocity values in its local neighborhood as $$V(x_1,x_2) = a_o + \sum_{i=1}^{2} a_i x_i + \sum_{i=1}^{2} a_{ii} x_i^2 + a_{12} x_1 x_2 \tag{24}$$

It is assumed that M and N are odd numbers. In terms of S's, the orthonormal basis wave forms, defined over the local neighborhood $\Gamma_0$, (24) becomes $$V(X) = a_o + \sum_{i=1}^{2} a_i S_i(X) + \sum_{i=1}^{2} a_{ii} S_{ii}(X) + a_{12} S_{12}(X) \tag{24}$$

where X is coordinate vector and the functions S's are defined in terms of polynomials orthogonal over one-dimensional neighborhood as $$S_o(X) = P_{10}(x_1)P_{20}(x_2), \quad (26)$$

$$S_i(X) = P_{i1}(x_i)P_{jo}(x_j) \quad i,j = 1,2, \quad i \neq j$$

$$S_{ii}(X) = P_{i2}(x_i)P_{jo}(x_j) \quad i,j = 1,2, \quad i \neq j$$

$$S_{12}(X) = P_{11}(x_1)P_{21}(x_2),$$

where $$\begin{aligned} P_{io}(x_i) &= 1, \\ P_{i1}(x_i) &= x_i, \\ P_{i2}(x_i) &= x_i^2 - \mu_{i2}|\mu_{io}, \\ P_{i3}(x_i) &= x_i^3 - (\mu_{i4}|\mu_{i2})x_i, \\ \mu_{ik} &= \sum_{X_i} x_i^k \end{aligned} \quad (27)$$

and $X_i$ is the domain of coordinate variable $x_i$. The estimates of the coefficients a's are given as $$\left. \begin{aligned} a_o &= \frac{\Gamma_o \Sigma v(X)S_o(X)}{\Gamma_o \Sigma S_o^2(X)}, \\ a_i &= \frac{\Gamma_o \Sigma v(X)S_i(X)}{\Gamma_o \Sigma S_i^2(X)}, \\ a_{ii} &= \frac{\Gamma_o \Sigma v(X)S_{ii}(X)}{\Gamma_o \Sigma S_{ii}^2(X)}, \\ \text{and} & \\ a_{12} &= \frac{\Gamma_o \Sigma v(X)S_{12}(X)}{\Gamma_o \Sigma S_{12}^2(X)}. \end{aligned} \right\} \quad (28)$$

Use of Equations (26) and (27) simplify the denominators of equation (28) to $$\Gamma_o \Sigma S_o^2(X) = \mu_{10}\mu_{20}, \quad i,j = 1,2 \quad (29)$$
$$\Gamma_o \Sigma S_o^2(X) = \mu_{i2}\mu_{jo}, \quad i \neq j$$

$$\Gamma_o \Sigma S_i^2(X) = \mu_{jo}\left(\mu_{i4} - \frac{\mu_{i2}^2}{\mu_{io}}\right) \quad i,j = 1,2, \quad i \neq j$$

and
$$\Gamma_o \Sigma S_{12}^2(X) = \mu_{12}\mu_{22}$$

In terms of matrix notation, equation (24) becomes $$V(X) = a_o + H_1^T X + X^T H_2 X, \quad (30)$$

$$\text{where } X = \begin{bmatrix} x_1 \\ x_2 \end{bmatrix}, H_1 = \begin{bmatrix} a_1 \\ a_2 \end{bmatrix} \text{ and } H_2 = \begin{bmatrix} a_{11} & \tfrac{1}{2}a_{12} \\ \tfrac{1}{2}a_{12} & a_{22} \end{bmatrix} \quad (31)$$

Let the ray be entering the cell at position $X_o$ and let $V(X_o)$ be the velocity field at $X_o$, then from Equation (30), $V(X)$ can be expressed as $$V(X) = V(X_o) + (X - X_o)^T H_1 + (X + X_o)^T H_2(X - X_o) \quad (32)$$

Solving the Eikonel equation, expressions for the position $X(s)$, orientation $d(s)$, and the travel time $t(s)$ of the ray in the cell can be written as $$X(s) = X_o + s\,do + \frac{s^2}{2}\left[\frac{H_1^T do}{V(X_o)} + \frac{X_o^T H_2 do}{V(X_o)} \cdot do - \right.$$
$$\left. \frac{H_1}{V(X_o)} - \frac{H_2 X_o}{V(X_o)} \right] + \frac{s^3}{6}\left[\frac{do^T H_2 do}{V(X_o)} \cdot do - \frac{H_2 do}{V(X_o)}\right], \quad (33)$$

$$d(s) = do + s\left[\frac{H_1^T do}{V(X_o)} do + \frac{X_o^T H_2 do}{V(X_o)} \cdot do - \right.$$
$$\left. \frac{H_1}{V(X_o)} - \frac{H_2 X_o}{V(X_o)} \right] + \frac{s^2}{2}\left[\frac{do^T H_2 do}{V(X_o)} \cdot do - \frac{H_2 do}{V(X_o)}\right], \quad (34)$$

and $$t(s) = \frac{s}{V(X_o)}\left[1 - \frac{s}{2} + \right.$$
$$\left. \frac{H_1^T do}{V(X_o)} \frac{X^T H_2 do}{V(X_o)} - \frac{s^2}{6}\frac{do^T H_2 do}{V(X_o)}\right] \quad (35)$$

Using equations (31) and (35), the travel time expression can be rewritten as $$t(s) = \frac{\alpha_o a_o + \alpha_1 a_1 + \alpha_2 a_2 + \alpha_{11} + \alpha_{11}a_{22}a_{22} + \alpha_{12}a_{12}}{(\delta_o a_o + \delta_1 a_1 + \delta_2 a_2 + \delta_{11}a_{11} + \delta_{22}a_{22} + \delta_{12}a_{12})^2} \quad (36)$$

where
$$\alpha_o = s,$$

$$\alpha_i = \left(s\,x_{io} - \frac{s^2}{2} dox_i\right), i = 1,2$$

$$\alpha_{ii} = s\left(x_{io}^2 - \frac{\mu_{i2}}{\mu_{io}}\right) + \left(\frac{-s^2}{2} x_{io}\,dox_i\right) +$$
$$\left(\frac{-s^3}{6} dox_i^2\right), i = 1,2$$

$$\alpha_{12} = s\,x_{10}\,x_{20} + \left(\frac{-s^2}{4} x_{10}dox_2\right) - \frac{s^2}{4} x_{20}dox_2) +$$
$$\left(\frac{-s^3}{6} dox_1\,dox_2\right),$$

$$\begin{aligned} \delta_o &= 1, \\ \delta_i &= x_{io}, \\ \delta_{ii} &= \left(x_{io}^2 - \frac{\mu_{i2}}{\mu_{io}}\right), \end{aligned} \quad (37)$$

and
$$\delta_{12} = x_{10} x_{20}$$

Substitution of Equation (28) in Equation (36) yields $$t(s) = \frac{x_1 \Sigma \in \chi_1\, x_2 \Sigma \in \chi_2\, c(x_1, x_2)\, v(x_1, x_2)}{x_1 \Sigma \in \chi_1\, x_2 \Sigma \in \chi_2\, e(x_1, x_2)\, v(x_1, x_2)} \quad (38)$$

where $X_1$ and $X_2$ are domains of $x_1$ and $x_2$ and $c(x_1, x_2)$ and $e(x_1, x_2)$ are the weights of velocities at the cell corners of local two-dimensional neighborhood.

Next, the travel time must be expressed as a weighted combination of the velocities. For this, the Equation (38) can be written as $$t(s) = \frac{\Sigma C_l v_l}{(\Sigma e_l v_l)^2} = \frac{CN}{ED^2}, \quad (39)$$

where $C_l$ and $e_l$ are the weights and $v_l$ is the velocity at the $l$ cell corner, $1 \leq l \leq MN$. Let $\beta_l$ be defined as $$\beta_l = \frac{\partial t}{\partial v_l} \quad (40)$$

Then from Equations (39) and (40) we derive $$\beta_l = -\frac{2}{ED^3} e_l CN + \frac{1}{ED^2} C_l \quad (41)$$

From Equation (41), after making use of equation (39), there is obtained $$t = -\Sigma \beta_l v_l \quad (42)$$

Differentiating Equation (41) with respect to $v_j$ yields $$\frac{\partial \beta_l}{\partial v_j} = \frac{6}{ED^4} e_j e_l CN - \frac{2}{ED^3} e_l C_j - \frac{2}{ED^3} e_j C_l \quad (43)$$

And using Equation (41), we get from Equation (43)

$$\sum_l \frac{\partial \beta_l}{\partial v_j} v_l = -2\beta_l \quad (44)$$

Equations (42) and (44) follow after noting that t and $\beta$'s are homogeneous functions of velocities.

Ray tracing can also be carried out when slowness values are specified at the cell corners. At a point (x, y) in the cell, the bilinearly interpolated slowness value can be written as $$B(r) = B_o + G_1^{Tr} + \tfrac{1}{2} r^T G_2 r \quad (45)$$

The quantities $G_1$ and $G_2$ are defined as $$G_1 = \nabla_r (B(r))\big|_{r=o} = \begin{bmatrix} b_1 \\ b_2 \end{bmatrix} \quad (46)$$

and $$G_2 = \begin{bmatrix} \frac{\partial^2 B}{\partial x^2} & \frac{\partial^2 B}{\partial x \partial y} \\ \frac{\partial^2 B}{\partial x \partial y} & \frac{\partial^2 B}{\partial y^2} \end{bmatrix} = \begin{bmatrix} 0 & b_3 \\ b_3 & 0 \end{bmatrix} \quad (47)$$

where relationships are as follows:

$$b_o = B(0,0) \quad (48)$$

$$b_1 = (B(a,0) - B(0,0))|a,$$

$$b_2 = (B(0,b) - B(0,0))|b, \text{ and}$$

$$b_3 = (B(a,b) + B(0,0) - B(a,0) - B(0,b))|ab$$

Proceeding as in the preceding section relating to bilinear interpolation for the estimation of a velocity field (see FIG. 3), the expressions for the position, orientation, and travel time of the ray in the cell as a function of path parameter s can be obtained as $$r(s) = r_o + s \ d_o + \frac{s^2}{2} \frac{G_1}{B_0} - \frac{s^2}{2} d_o \frac{G_1^T d_o}{B_0} + \quad (49)$$

$$\frac{s^2}{2} \frac{G_2 r_o}{B_0} - \frac{s^2}{2} d_o \frac{r_o^T G_2 d_o}{B_0} + \frac{s^3}{6} \frac{G_2 d_o}{B_0} - \frac{s^3}{6} d_o \frac{d_o^T G_2 d_o}{B_0}$$

$$d(s) = d_o + s \frac{G_1}{B_0} - s d_o \frac{G_1^T d_o}{B_0} + s \frac{G_2 r_o}{B_0} - \quad (50)$$

$$s d_o \frac{r_o^T G_2 d_o}{B_0} + \frac{s^2}{2} \frac{G_2 d_o}{B_0} - \frac{s^2}{2} d_o \frac{d_o^T G_2 d_o}{B_0}$$

$$t(s) = B_o s + s G_1^T r_o + \frac{s^2}{2} G_1^T d_o + \frac{s}{2} r_o^T G_2 r_o + \quad (51)$$

$$\frac{s^2}{2} r_o^T G_2 d_o + \frac{s^3}{6} d_o^T G_2 d_o$$

Equations (49), (50) and (51) can then be written as follows:

$$r(s) = r_o + s d_o + s^2 n_1 + s^3 n_2 \quad (52)$$

$$d(s) = d_o + 2 \ s n_1 + 3 \ s^2 n_2 \quad (53)$$

and $$t(s) = \beta_o B(0,0) + \beta_a B(a,0) + \beta_b B(0,b) + \beta_{ab} B(a,b) \quad (54)$$

Where values derive as follows:

$$n_1 = d_o \left[ -d_o^T \begin{pmatrix} (b_1 + b_3 y_o)|2b_o \\ (b_1 + b_3 x_o)|2b_o \end{pmatrix} \right] + \begin{pmatrix} (b_1 + b_3 y_o)|2b_o \\ (b_2 + b_3 x_o)|2b_o \end{pmatrix}$$

$$n_2 = d_o \left[ -d_o^T \begin{pmatrix} b_3 \ dy(0)|6b_o \\ b_3 \ dx(0)|6b_o \end{pmatrix} \right] + \begin{pmatrix} b_3 \ dy(0)|6b_o \\ b_3 \ dx(0)|6b_o \end{pmatrix} \quad (55)$$

$$\left.\begin{array}{l} \beta_o = \alpha_o - \dfrac{\alpha_1}{a} - \dfrac{\alpha_2}{b} + \dfrac{\alpha_3}{ab} \\ \beta_a = \dfrac{\alpha_1}{a} - \dfrac{\alpha_3}{ab} \\ \beta_b = \dfrac{\alpha_2}{a} - \dfrac{\alpha_3}{ab} \\ \beta_{ab} = \dfrac{\alpha_3}{ab} \end{array}\right\} \quad (56)$$

$$\left.\begin{array}{l} \alpha_o = s \\ \alpha_1 = s \ x_o + \dfrac{s^2}{2} \ dx(0) \\ \alpha_2 = s \ y_o + \dfrac{s^2}{2} \ dy(0) \\ \text{and} \\ \alpha_3 = \alpha_1 \ y_o + \dfrac{s^2}{2} \ dy(0) \ x_o + \dfrac{s^3}{3} \ dx(0) \ dy(0) \end{array}\right\} \quad (57)$$

Equation (54) expresses the travel time in the cell as a linearly weighted combination of slowness values at the four corners of the cell.

Figure 6:
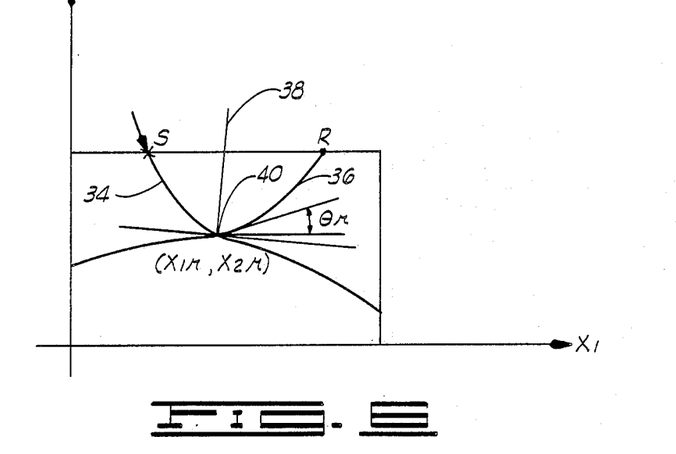
FIG. 6 is a graphic illustration of incident and reflected rays/from a reflector in the cell.

The case is altered when there is a reflector in the cell. As shown in FIG. 6, there is depicted an incident ray 34, and a reflected ray 36, reflecting about a line 38 normal to the reflector point 40 in the cell. The position and orientation of the ray in the cell as a function of path parameter s can be written as $$X(s) = X_o + s\, do + \frac{s^2}{2} \eta_1 + \frac{s^3}{6} \eta_2 \tag{58}$$

and $$d(s) = do + s\, \eta_1 + \frac{s^2}{2} \eta_2 \tag{59}$$

where $$\eta_1 = \begin{bmatrix} \eta_{11} \\ \eta_{12} \end{bmatrix}, \text{ and } \eta_2 = \begin{bmatrix} \eta_{21} \\ \eta_{22} \end{bmatrix} \tag{60}$$

The reflector 40 in the cell is assumed to be described as a piece of cubic spline. That is $$x_2 = A + B x_1 + C x_1^2 + D x_1^3 \tag{61}$$

The coordinates $(x_{2r}, x_{1r})$, the point of intersection of the ray 34 with the reflector in the cell is computed from $$x_{1r} = x_{10} + d_{x1}(o)\, s_r + \eta_{11}\, s_r^2 + \eta_{21}\, s_r^3 \tag{62}$$

and $$x_{2r} = x_{20} + d_{x2}(o)\, s_r + \eta_{12}\, s_r^2 + \eta_{22}\, s_r^3 \tag{63}$$

and, where $s_r$ is a root of the equation $$[(A + B x_{10} + C x_{10}^2 + D x_{10}^3) - x_{20}] + s\,\{[B\, d_{x1}(o) + \tag{64}$$
$$C\, 2 x_{10}\, d_{x1(o)} + D\, 3 x_{10}^2\, d_{x1}(o)] - d_{x2}(o)\} + s^2\,[\{B\eta_{11} +$$
$$C\,(2 x_{10}\, \eta_{11} + d_{x1}^2(o)) + D\,(3 x_{10}\, d_{x1}(o) + 3\, \eta_{11}\, x_{10}^2)\} -$$
$$\eta_{12}] + s^3\,[\{B\, \eta_{21} + C\,(2\, d_{x1}(o)\, \eta_{11} + 2 x_{10}\, \eta_{21}) +$$
$$D\,(d_{x1}^3(o) + 3\, \eta_{21}\, x_{10}^2 + 6 x_{10}\, d_{x1}(o)\, \eta_{11})\} - \eta_{21}] = o.$$

When the slope of the reflector is very small and the reflector is very close to a horizontal boundary, the coordinates of the point of intersection of the ray with the reflector can be approximately computed from $$x_{2r} = \frac{[(x_{20}\, d_{x1}(o) - x_{10}\, d_{x2}(o)) - A\, d_{x1}(o)]}{[B\, d_{x1}(o) - d_{x2}(o)]}, \tag{65}$$

and $$x_{2r} = \frac{[B\,(x_{20}\, d_{x1}(o) - x_{10}\, d_{x2}(o)) - A\, d_{x2}(o)]}{[B\, d_{x1}(o) - d_{x2}(o)]}, \tag{66}$$

Let $\nu$ be the slope of the reflector at $x_{1r}$ and $x_{2r}$. That is $$\nu = \left.\frac{\partial x_2}{\partial x_1}\right| = B + 2C x_{1r} + 3 D x_{1r}^2 \tag{67}$$
$$x_1 = x_{1r}$$

The orientation of the reflected ray at the point $(x_{1r}, x_{2r})$ is given by $(\cos\theta r, \sin\theta r)$, where $$\cos\theta r = \frac{1}{(1 + \nu^2)} [-\nu^2\, d_{x1}(s_r) + 2\nu\, d_{x2}(s_r) + d_{x1}(s_r)] \tag{68}$$

and $$\sin\theta r = \frac{1}{(1 + \nu^2)} [\nu^2\, d_{x2}(s_r) + 2\nu\, d_{x1}(s_r) - d_{x2}(s_r)] \tag{69}$$

Another function of flow stage 10 (FIG. 1) requires estimation of sensitivity matrix elements. The derivatives of travel time with respect to the velocities at the cell corners can be obtained from Equation (42). The estimation of derivatives of travel time with respect to the reflector position parameters is described below. In a first case for estimation without perturbing the reflector, reference is made to FIG. 7.

Figure 7:
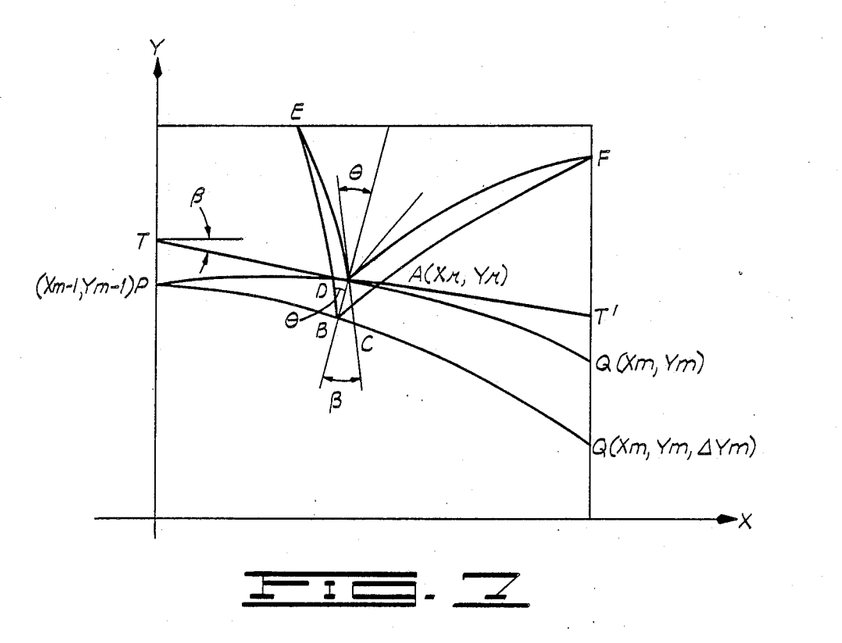
FIG. 7 is a graphic illustration of perturbation of the travel path due to change in the right-side reflector end point.

The change in the travel time of the reflector with respect to the change in position of the end point of the reflector can be obtained for both right-and left-side end points. For the right-side end point as shown in FIG. 7, let TT' be the tangent to the reflecting surface, and $A(x_r, y_r)$ be the point of intersection of incident ray with the reflecting surface. Let $\theta$ define the angle of incidence and $\beta$ define the orientation of TT'. Let the right-side end point be changed from Q to Q', and let $\Delta Y_m$ define the change. Finally, let the ray path in the cell change from EAF to EBF. Assuming then that the changes in the reflector within the cell are small, we can write $$\frac{AC}{QQ'} = \frac{(x_r - x_{m-1})}{(x_m - x_{m-1})} \tag{70}$$

As indicated in FIG. 7, we obtain $$BD = AB \cos\theta \tag{71}$$
$$= AC \cos\beta \cos\theta$$

Let $\Delta t$ be the travel time perturbation. That is $$\Delta t = 2BD|V(x_r, y_r) \tag{72}$$

where $V(x_r, y_r)$ is the value of the velocity field at the point $(x_r, y_r)$. From Equations 70-72, the change of travel time of the ray in the cell with respect to the change in the right-side end point of the reflector can be obtained as $$\frac{\Delta t}{\Delta y_m} = (2|V(x_r,y_r)) \cos\beta \cos\theta \frac{(x_r - x_{m-1})}{(x_m - x_{m-1})} \tag{73}$$

Figure 8:
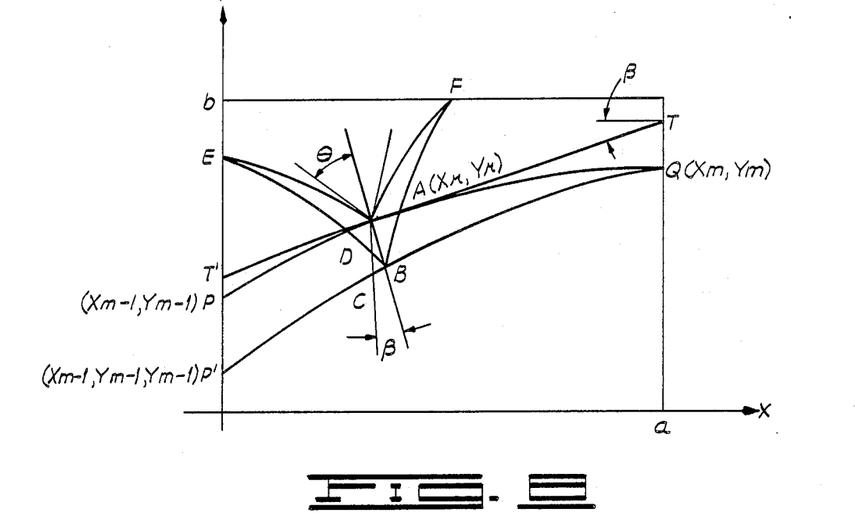
FIG. 8 is a graphic illustration of perturbation of the travel path due to change in the left-side end point of the reflector.

Referring to FIG. 8, there is shown the change in the travel path of the ray for a change in left-side end point of the reflector. Proceeding as before, the change of travel time with respect to the change in the left-side end point of the reflector can be obtained as $$\frac{\Delta t}{\Delta y_{m-1}} = 2\, \frac{1}{V(x_r, y_r)} \cos\beta\cos\theta \frac{(x_m - x_r)}{(x_m - x_{m-1})} \tag{74}$$

Figure 9:
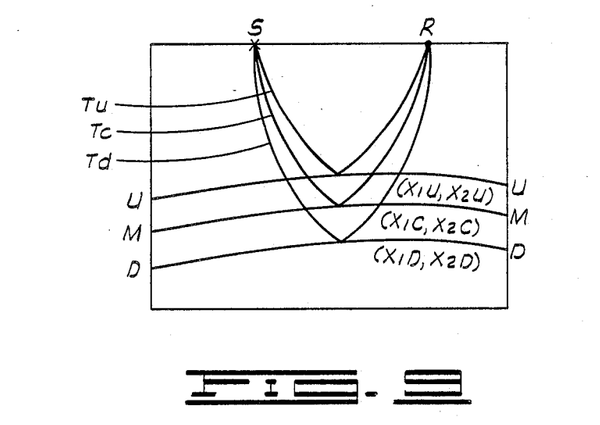
FIG. 9 is a graphic showing of travel times and points of intersection of the ray with the reflector for each of three reflector positions.

The derivatives of travel time with respect to the reflector position parameters can also be estimated by perturbing the reflector up and down by known amounts. Referring to FIG. 9, there is shown the rays between source S and receiver R during controlled perturbation up and down. The travel time of the ray and the coordinates of the point of intersection of the ray with the reflector are recorded for each reflector position. Let tu, tc, and td be the travel time of the rays with respect to the upper, middle, and lower reflector positions. Let $\{(x_{1u}, x_{2u}), (x_{1c}, x_{2c}), (x_{1d}, x_{2d})\}$ be point of intersection of the ray with the upper, middle, and lower reflector positions, respectively.

Then let $$\begin{aligned} \Delta t_u &= tu - tc, \\ \Delta t_d &= td - tc, \\ \Delta x_{1u} &= x_{1u} - x_{1c}, \\ \Delta x_{2u} &= x_{2u} - x_{2c}, \\ \Delta x_{1d} &= x_{1d} - x_{1c}, \\ \text{and} \\ \Delta x_{2d} &= x_{2d} - x_{2c}. \end{aligned} \tag{75}$$

The derivative of the travel time with respect to the $x_2$ coordinate of the point of intersection of the ray with the middle reflection position can be estimated from $$\Delta t_{x2} = \frac{\partial t}{\partial x_2}\bigg| = \frac{\Delta x_{1u} \Delta t_d - \Delta x_{1d} \Delta t_u}{(\Delta x_{1u} \Delta x_{2d} - \Delta x_{1d} \Delta x_{2u})} \tag{76}$$

$$x_2 = x_{2c}$$
$$x_1 = x_{1c}$$

Figure 10:
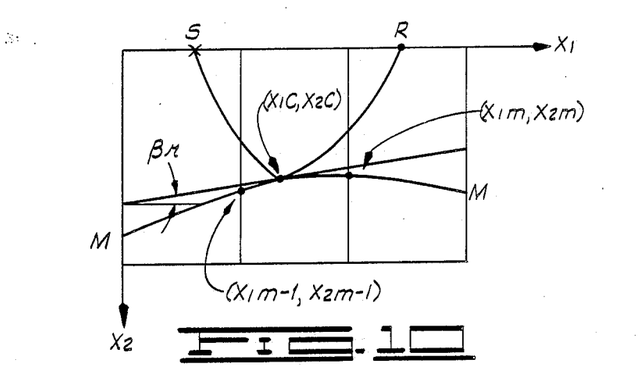
FIG. 10 illustrates graphically the point of intersection of a ray with the middle reflector position.

Letting the ray intersect the middle reflector in the $(m-1)$th horizontal cell position as depicted in FIG. 10, and letting $\beta_r$ be the angle of tangent of the reflector at the point of intersection of the ray with the middle reflector position, the derivatives of travel time with respect to the parameters of the reflector at the right- and left-side cell walls of the point $(x_{1c}, x_{2c})$ can be estimated from $$\xi_r = \frac{\Delta t_{x2} (x_{1u} - x_{1m-1})}{(x_{1m} - x_{1m-1})(\Delta x_{2u} - tm\, \beta_r \Delta x_{1u})}, \tag{77}$$

and $$\xi_L = \frac{\Delta t_{x2} (x_{1m} - x_{1u})}{(x_{1m} - x_{1m-1})(\Delta x_{2u} - tm\, \beta_r \Delta x_{1u})}, \tag{78}$$

Figure 11A:
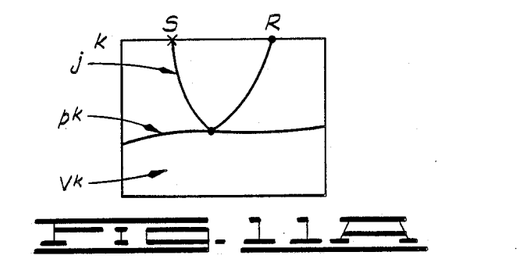
FIGS. 11A, 11B and 11C illustrate parameters of the medium in relation to an eigenray.
Figure 11B:
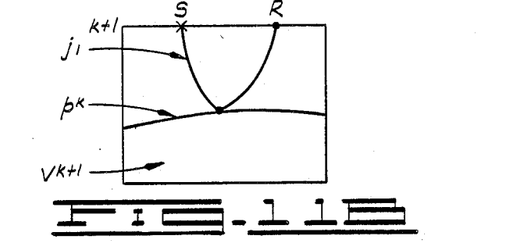
Figure 11C:
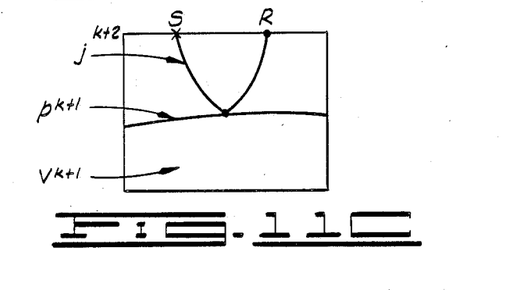

It is also necessary to derive the basic travel time equation. As the model parameters are updated (flow stage 18 of FIG. 1) from iteration k to iteration k+1, FIGS. 11A, 11B, and 11C pictorially depict in generalized form the medium parameters and the corresponding eigenray at various stages of parameter updating. Letting $V^k$, $p^k$, and $j^k$ be the medium velocity vector, reflection position parameter vector and the eigenray at the kth iteration, then $j^k$ is a function of $V^k$, $p^k$. For a particular source, receiver and reflector position, let $t^k$ be the estimated travel time of eigenray at the kth iteration. We can then write $$t^k = \int_{j^k(V^k, p^k)} \frac{ds}{v^k(s)}, \tag{79}$$

where $v^k(s)$ the velocity along the ray $j^k$ and s is the path parameter, letting $$V^{k+1} = V^k + \Delta V^k, \tag{80}$$

and $$p^{k+1} = p^k + \Delta p^k.$$

The correction terms $\Delta V^k$ and $\Delta p^k$ are estimated such that the travel time $t^{k+1}$ is made equivalent to true travel time t. Let $$t_1^{k+1} = \int_{j_1^{k+1}(V^{k+1}, p^k)} \frac{ds}{v^{k+1}(s)} \tag{81}$$

Define the variable I to denote the integrals $$I(j^k(V^k, p^k), V^k) = \int_{j^k(V^k, p^k)} \frac{ds}{v^k(s)} \tag{82}$$

Expanding $t^{k+1}$ around $t_1^{k+1}$, we get $$t^{k+1} = I(j_1^{k+1}(V^{k+1}, p^k), V^{k+1}) + \frac{\partial I}{\partial p}\bigg|_{\{j_1^{k+1}(V^{k+1}, p^k), V^{k+1}\}} \Delta p^k \tag{83}$$

Again using the linearization process, we can write $$\frac{\partial I}{\partial p}\bigg|_{\{j_1^{k+1}(V^{k+1}, p^k), V^{k+1}\}} = \frac{\partial I}{\partial p}\bigg|_{\{j^k(V^k, p^k), V^k\}} + \frac{\partial^2 I}{\partial v \partial p}\bigg|_{\{j^k(V^k, p^k), V^k\}} \Delta V^k \tag{84}$$

$$= \frac{\partial I}{\partial p}\bigg|_{\{j^k(V^k, p^k), V^k\}}$$

where the products of terms of first order smallness are assumed to be neglected. In both Equations (83) and (84), the change of I with respect to the change in the eigenray j is neglected to a first order approximation. Use of Equation (84) in (83) yields $$t^{k+1} = I(j_1^{k+1}(V^{k+1}, p^k), V^{k+1}) + \sum_l \xi_l^k \Delta p_l^k \tag{85}$$

where $\xi_l^k$ are the derivatives of travel time with respect to the reflection position parameters. Letting $\{\beta_l^{k+1}\}$ pertain to path $j_l^{k+1}$ and $\{\beta_l^k\}$ pertain to path $j^k$, then from Equation (42) we can write $$I(j_1^{k+1}(V^{k+1}, p^k), V^{k+1}) = -\sum_l \beta_l^{k+1} v_l^{k+1}, \tag{86}$$

and $I(j^k(V^k, p^k), V^k = -\sum_l \beta_l^k v_l^k. \tag{87}$

Let $\beta_l^{k+1} = \beta_l^k + \Delta \beta_l^k, \tag{88}$ and $v_l^{k+1} = v_l^k + \Delta v_l^k.$ Consider $$-\Sigma \beta_l^{k+1} v_l^{k+1} = -\Sigma \beta_l^{k+1} v_l^k - \Sigma \beta_l^k \Delta v_l^k - \Sigma \Delta \beta_l^k \Delta v_l^k. \tag{89}$$

Expanding $\beta_l^{k+1}$ around $\beta_l^k$ there follows $$\beta_l^{k+1} = \beta_l^k + \sum_j \frac{\partial \beta_l^k}{\partial v_j} \bigg|_{V=V^k} \Delta v_j^k \quad (90)$$

From Equations (44) and (90), we obtain $$\sum_l \beta_l^{k+1} v_l^k = \sum_l \beta_l^k v_l^k + \sum_j \left( \sum_l \frac{\partial \beta_l^k}{\partial v_j} \bigg|_{V=V^k} v_l^k \right) \Delta v_j^k \quad (91)$$

$$= \sum_l \beta_l^k v_l^k - 2 \sum_j \beta_j^k \Delta v_j^k$$

Using Equation (91), (89) and (86) in Equation (85) yields $$t^{k+1} = -\sum_l \beta_l^k v_l^k + \sum_l \beta_l^k \Delta v_l^k + \sum_l \xi_l^k \Delta p_l^k - \sum_l \Delta \beta_l^k \Delta v_l^k \quad (92)$$

Letting $t^{k+1}$ equal t, the true travel time, while ignoring the product of terms of first order smallness, the Equation (92) can be written as $$\Delta t^k = \sum_l \beta_l^k \Delta v_l^k + \sum_l \xi_l^k \Delta p_l^k \quad (93)$$

where $$\Delta t^k = t - t^k \quad (94)$$

For a particular source, receiver, and reflector position, Equation (93) relates the travel time errors to the model parameter correction terms under the linearization assumptions discussed above.

In the estimation of model parameters, the program process requires routines (a) for parameter updating when there are no sharp contrasts present in the velocity as well as the alternative mode of parameter updating (b) when there are sharp contrasts present in the velocity field. A ray based algorithm for the computation of parameter correction terms is presented below. The ray tracing and parameter correction parts are arranged as given in the flow chart of FIG. 1. From Equation (93), the travel time equation for the jth ray at the kth iteration can be written as $$\Delta t_j^k = \sum_l \beta_{jl}^k \Delta v_{jl}^k + \sum_l \xi_{jl}^k \Delta p_{jl}^k \quad (95)$$

where $\Delta v_{jl}^k$ and $\Delta p_{jl}^k$ are based correction terms and are estimated as $$\Delta v_{jl}^k = \frac{\Delta t_j^k \beta_{jl}^k}{\left( \sum_i \beta_{ji}^{k2} + \sum_i \xi_{ji}^{k2} \right)} , \quad (96)$$

and $$\Delta p_{jl}^k = \frac{\Delta t_j^k \xi_{jl}^k}{\left( \sum_i \beta_{ji}^{k2} + \sum_i \xi_{ji}^{k2} \right)} \quad (97)$$

The corrections to the velocity and the reflector position parameter vectors are made using the relationships $$v_l^{k+1} = v_l^k + \alpha_v \Delta s v_l^k, \quad (98)$$
$$p_l^{k+1} = p_l^k + \alpha_p \Delta s p_l^k, \quad (99)$$

$$\Delta s v_l^k = \frac{1}{n_l} \sum_j \Delta v_{jl}^k, \quad (100)$$

and $$\Delta s p_l^k = \frac{1}{m_l} \sum_j \Delta p_{jl}^k \quad (101)$$

where $n_l$ and $m_l$ are the number of rays contributing to the th velocity parameter $v_l$ and l th reflector position parameter $p_l$. The quantities $\alpha_v$ and $\alpha_p$ are estimated from $$\alpha_v = (A_{22} b_1 - A_{12} b_2)/D, \quad (102)$$

and $$\alpha_p = (A_{11} b_2 - A_{12} b_1)/D,$$

where $$D = A_{11} A_{22} - A_{12}^2, \quad (103)$$

$$A_{11} = \sum_j \left( \sum_l \beta_{jl}^k \Delta v_{jl}^k \right)^2,$$

$$A_{22} = \sum_j \left( \sum_l \xi_{jl}^k \Delta p_{jl}^k \right)^2,$$

$$A_{12} = \sum_j \left( \sum_l \beta_{jl}^k \Delta v_{jl}^k \right) \left( \sum_l \xi_{jl}^k \Delta p_{jl}^k \right),$$

$$b_1 = \sum_j \Delta t_j^k \left( \sum_l \beta_{jl}^k \Delta v_{jl}^k \right)$$

and $$b_2 = \sum_j \Delta t_j^k \left( \sum_l \beta_{jl}^k \Delta p_{jl}^k \right)$$

The parameters are adjusted iteratively until there is no appreciable reduction in the travel time error or until the travel time error begins to increase.

When sharp contrasts are present in the velocity field, the parameter estimation is arranged around swaths of rays. For a particular swath containing n rays, the estimation equation will be of the form $$Z = Hx + v \quad (104)$$

Where Z is a nxl travel time error vector, H is a known matrix, x is an unknown parameter vector (velocities at the cell corners and reflector position parameters) and v is a noise vector. Assuming the variables are gaussian, then a Bayesian solution for the iterative updating of unknown parameter vector x can be written as $$x^{k+1} = x^k + P_o H^T (H P_o H^T + R)^{-1} (Z - Hx^k) \quad (105)$$

The above scheme requires ray tracing and parameter updating for each swath of rays and the computations are stopped whenever certain convergence condition is satisfied.

Figure 12:
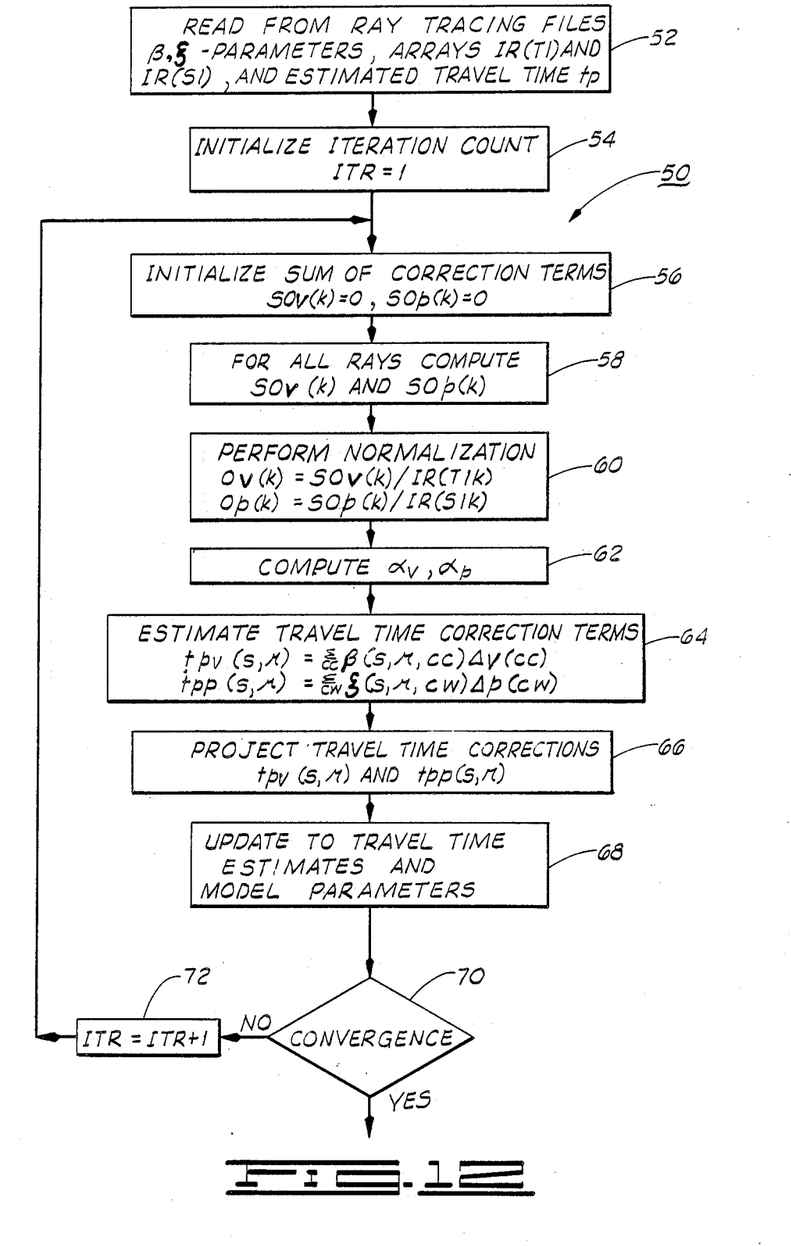
FIG. 12 is a detailed flow diagram of tomographic parameter estimation process.

FIG. 12 represents a detailed flow diagram of the tomographic parameter estimation process. Initial parameters will all have been written to file. That is, the $\beta$ parameters consisting of derivatives of travel time with respect to the velocities at the cell corners, and the $\xi$ parameters consisting of the derivatives of travel time with respect to the reflector position parameters, the number of rays visiting each cell corner IR(TI) array, the number of rays visiting each reflector position parameter IR(SI) array, and the travel time estimate of each ray.

In accordance with flow diagram 50, FIG. 12, flow stage 52 functions to read from the ray tracing files each of the sensitivity matrix elements: that is, the derivatives of travel time with respect to velocities at the cell corners—the $\beta$ parameters (Equation 41); the derivatives of travel time with respect to the reflector position parameters—$\xi$ parameters (Equations 77 and 78 or Equations 73 and 74); the number of rays visiting each cell corner—IR(T1) array; the number of rays visiting each reflector position parameter—IR(SI) array, and ray travel time estimates $t_p$ as derived by Equations (18), (36) or (51).

The flow stage 54 then initializes the iteration count and stage 56 initializes the sum of corrections for the velocities at cell corners, SOv (k), and the sum of the corrections for the reflector position parameters SOp(k). Flow stage 58 then computes the sum of the corrections for all rays for each velocity and reflector position parameter utilizing the relationships of Equations (96) and (97). Flow stage 60 then normalizes the correction terms and function proceeds to flow stage 62 for computation of alpha quantities using the Equations (102).

The next flow stage 64 functions to compute the estimated travel time correction terms while flow stage 66 applies or shoots the travel time corrections to the data with subsequent update of the travel time estimates and the model parameters as carried out at flow stage 68. Finally, convergence stage 70 functions to make a decision in response to predetermined convergence criteria and stops all computations when convergence is reached; that is, where there is no appreciable decrease in the travel time errors or the process has carried out a specified number of iterations. If decision stage 70 is affirmative then data is output, but if not then the process recycles through flow stage 72 to repeat iterations or begin again at flow stage 56 with initialization of the sum of correction terms through designated iterations. This cycling process continues until a convergence is satisfied to provide an output from decision stage 70.

The foregoing discloses a novel seismic processing technique that enables accurate determination of laterally varying velocity estimations over an extended assemblage of seismic section data. It is a subgoal of the objective to develop velocity estimation processes that will aid in depth migration and contribute to greater accuracy in seismic imaging. The present invention utilizes a tomographic technique in processing a line of seismic section data such that a move-along interval velocity estimation process is brought about.

Changes may be made in combination and arrangement of steps as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

I claim:

1. A method of seismic energy processing to determine estimated velocities using a diffraction tomographic technique, comprising the steps of:
   inputting pre-processed and dynamically corrected seismic section data as derived for selected sources and receivers along a line of survey over an inhomogeneous earth medium;
   determining true travel times between each source and each receiver for specific reflectors of the section data;
   estimating travel times and sensitivity matrix parameters with respect to model parameters of the section data for source-reflector-receiver rays of an initial model;
   receiving the true travel times and the estimated model travel times and determining ray-based parameter corrections by designating the earth medium as a predetermined array of cells of selected size and determining energy velocities at respective cell corners, and energy reflectors in terms of cell depth;
   updating the model parameters as a weighted combination of the ray-based corrections;
   iterating the steps of determining ray-based parameter corrections and updating the model parameters;
   testing the updated travel time parameters to determine if convergence criteria are satisfied such as when there is no appreciable decrease in travel time error; and
   outputting the estimated velocities relative to the reflector position for the section data.

2. A method as set forth in claim 1 which further includes steps of:
   receiving updated parameter data output from said testing stage when convergence criteria are not satisfied and recycling data input again to the determination of ray-based parameter corrections and subsequent processing.

3. A method as set forth in claim 1 which further includes steps of:
   receiving updated parameter data output from the testing stage when the convergence criteria are satisfied and re-estimating travel times and sensitivity matrix elements by reprojecting rays with an updated model, and recycling data input again to the determination of ray-based parameter corrections and subsequent processing.

4. A method as set forth in claim 1 wherein the velocities are allowed to vary within a cell in both x and y directions.

5. A method as set forth in claim 1 wherein the sensitivity matrix elements are estimated using a local neighborhood reconstruction of velocity field in the cell and solving eikonel equation.

6. A method as set forth in claim 1 wherein the sensitivity matrix elements of reflector position parameters are estimated directly from the source-reflector-receiver rays.

7. A method as set forth in claim 1 wherein the medium parameters could be slowness values.

8. A method as set forth in claim 1 wherein the estimated medium parameters could be used to fulfill all interval velocity data applications.

9. A method for processing seismic data to effect tomographic parameter estimation related to laterally varying seismic energy velocities, comprising:
   inputting pre-processed and dynamically corrected seismic section data as derived for selected offset sources and receivers along a designated line of survey;
   aligning the seismic section data with a grid array of two-dimensional cells of predetermined coordinate size;
   writing to file for each offset each of the derivatives of travel time with respect to velocities at cell corners, the derivatives of travel time with respect to reflector position parameters, the number of rays visiting each cell corner, the number of rays visiting each reflector position parameter, the travel time estimate of each ray;

read from file for ray tracing each of model parameters consisting of the derivatives of travel time for velocities at cell corners, the derivatives of travel time for reflector position parameters, the number of rays visiting each cell corner, the number of rays visiting each reflector position parameter, and the travel time estimate of each ray;

initialize the iteration count;

initialize the sum of corrections for the velocities at cell corners, and the sum of corrections for the reflector position parameters;

determine the sum of corrections for all rays for each velocity and reflector position parameter;

normalize all summed correction values;

compute estimates of the ray-based quantities $\alpha_v$ and $\alpha_p$;

query data to determine extent of convergence; and outputting the data result when predetermined convergence is attained.

10. A method as set forth in claim 9 which is further characterized to include steps of:

estimating travel time correction terms after computing estimates of $\alpha_v$ and $\alpha_p$; and performing next iteration of data by applying the trace time correction terms to reinitialize the sum of corrections for the velocities at cell corners, and the sum of corrections for the reflector position parameters.

11. A method as set forth in claim 10 wherein said step of performing next iteration comprises:

projecting the estimated travel time correction terms;

updating the travel time estimates and the model parameters; and querying data to determine if convergence has been attained.

12. A method as set forth in claim 11 wherein:

the query data stage checks to determine if parameters are adjusted so that there is no appreciable reduction in travel time error.

13. A method as set forth in claim 11 wherein:

the query data stage checks to determine if the travel time error begins to increase.

14. A method as set forth in claim 9 wherein:

the query data stage checks to determine if parameters are adjusted so that there is no appreciable reduction in travel time error.

15. A method as set forth in claim 9 wherein:

the query data stage checks to determine if the travel time error begins to increase.

16. A method as set forth in claim 9 wherein the velocities are allowed to vary within a cell in both x and y directions.

17. A method as set forth in claim 9 wherein the medium parameters could be slowness values.

18. A method as set forth in claim 9 wherein the estimated medium parameters could be used to fulfill all interval velocity data applications.

* * * * *